UNITED STATES PATENT OFFICE.

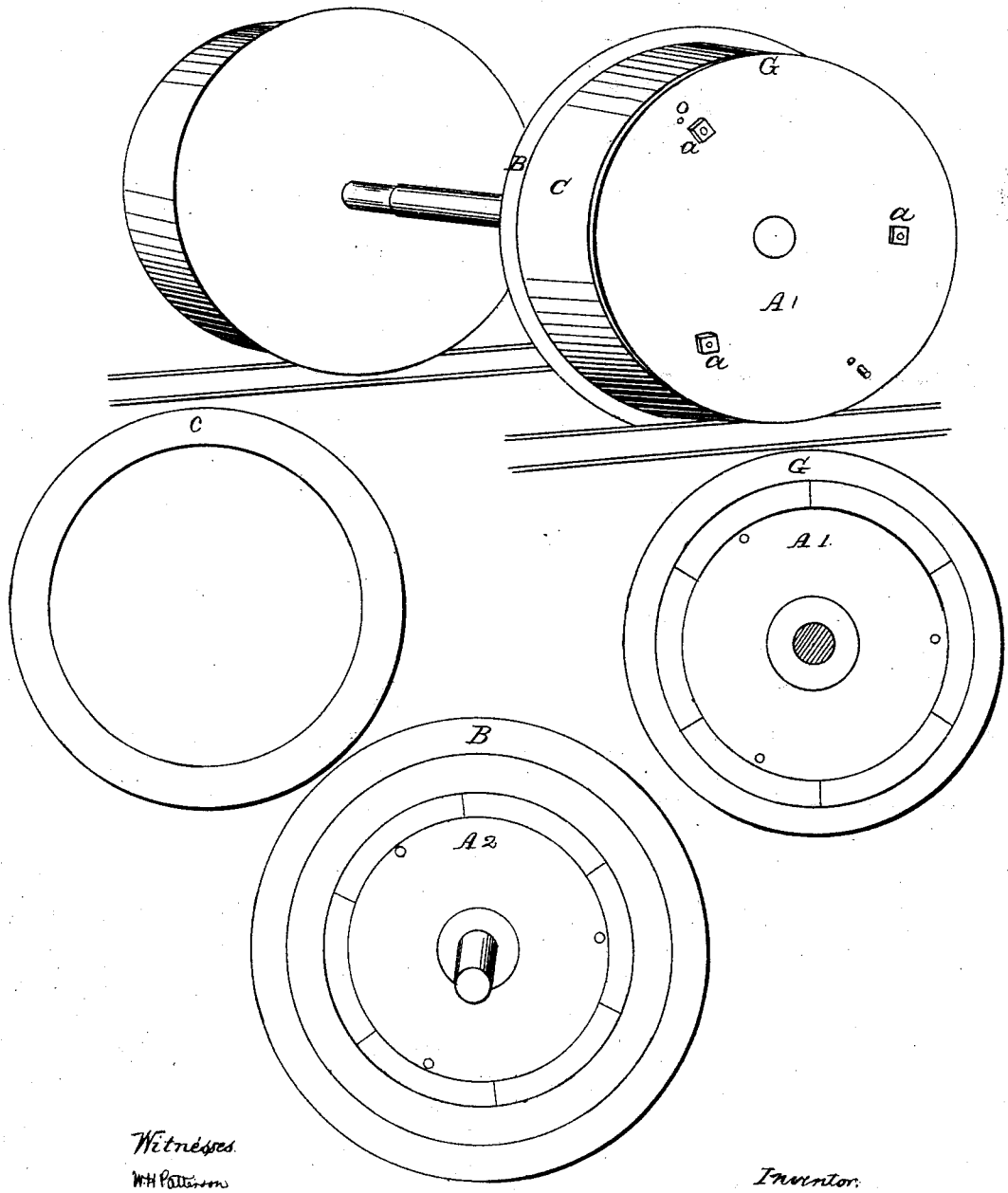

GEORGE C. BEECHER, OF LIVONIA, NEW YORK.

IMPROVEMENT IN ANTI-FRICTION CAR-WHEELS.

Specification forming part of Letters Patent No. 37,269, dated January 6, 1863.

*To all whom it may concern:*

Be it known that I, GEORGE C. BEECHER, of the town of Livonia, county of Livingston, in the State of New York, have invented a new and improved mode of preventing the friction of railroad-car wheels on the track in turning curves when such friction is caused by the inequality of the distance traversed on the two tracks, respectively; and I do hereby declare that the following is a full and exact description thereof, reference being had to the accompanying drawings and the letters of reference marked thereon.

The nature of my invention consists in providing car-wheels with a friction wheel or band, which wheel or band is to be held in place by a cap or section of the wheel bolted to the other section so as to firmly secure said friction wheel or band, yet admit of the free revolution thereof in advancing or receding (as the case may be) in turning curves.

To enable others skilled in the art to make and use my invention, I will proceed to describe its construction and operation.

I construct the body of my wheel in two parts or sections, A' and A², which sections are to be attached to each other with three or more bolts, *a a a*, or in any other suitable and substantial manner. Between the securing-rim G on section A', and the flange B on section A², I place the friction band or wheel C, said wheel or band to be made of wrought or cast iron, or any other metal or composition of metals suitable therefor. I so turn and otherwise prepare said friction wheel or band and the part or parts of the main wheel on which it turns as to cause it to fit as closely and turn as easily as the journal in its box in ordinary machinery. I also make two or more openings, *o o*, (in section A',) for convenience in oiling.

In turning curves the friction wheel or band C will advance and recede on the outer and inner tracks, respectively, independently of the revolutions of the axle and main wheels firmly attached thereto, thus securing the effect of a hubbed wheel turning independently on a stationary axle without any of the accompanying danger from wabbling.

Having thus described my invention, I will proceed to state what I claim and desire to secure by Letters Patent. I do not claim any particular form of or manner of constructing the main wheel or the parts thereof, nor do I intend to limit myself to the precise manner of securing said friction wheel or band in its place on the rim or tread of the main wheel or to the precise manner of constructing said friction wheel or band, either solid, hollow, spoked, or in any other suitable form or manner; but

I claim—

The application to railroad-car wheels of friction wheels or bands, of wrought or cast iron, or any other suitable metal, and of any desired thickness, which will prevent friction in turning curves by the independent revolutions of said friction wheels or bands, in the manner substantially as described.

GEO. C. BEECHER.

Witnesses:
    F. M. GIBBS,
    M. E. GIBBS.